Figure 1:
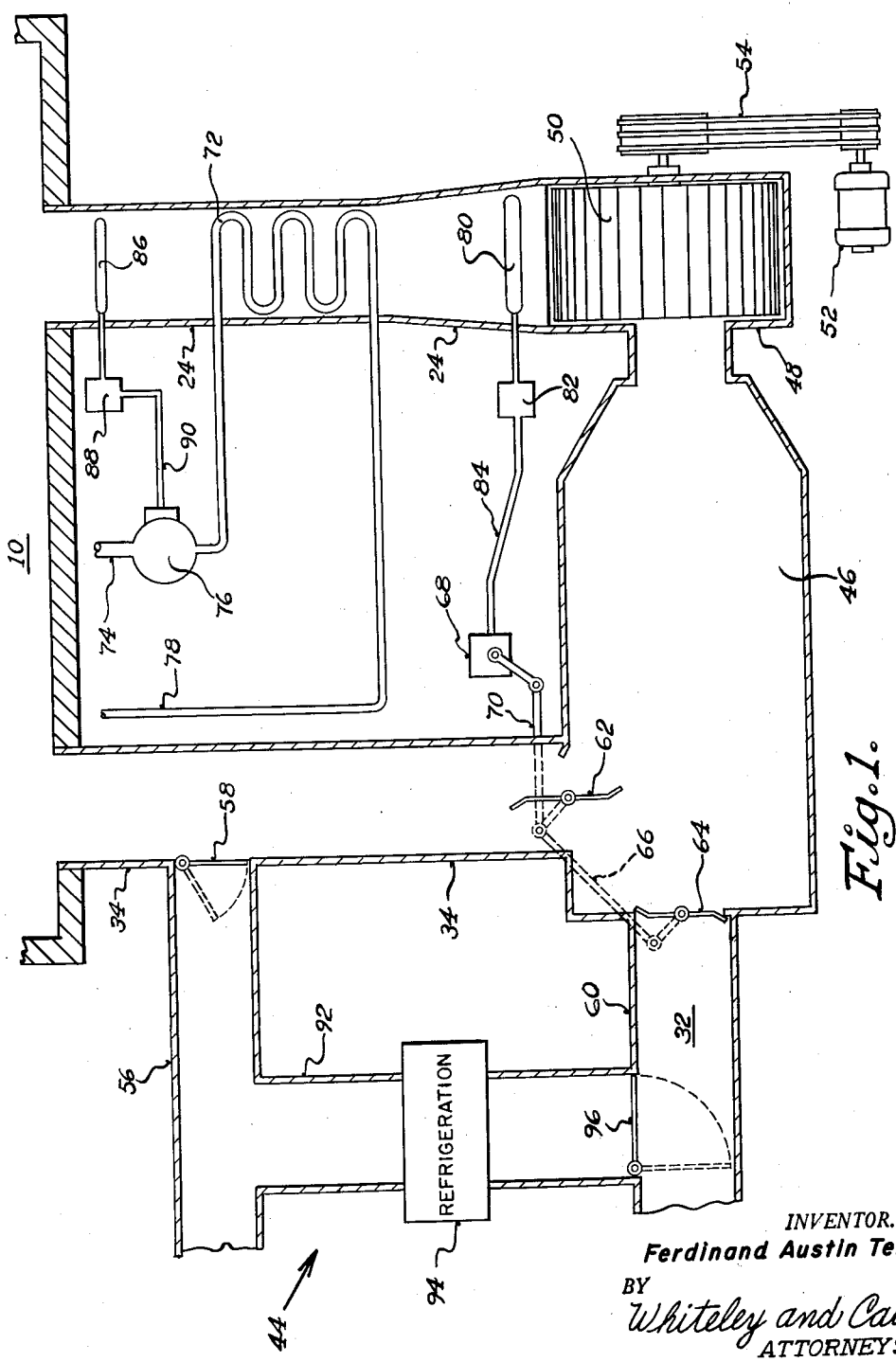

INVENTOR.
Ferdinand Austin Teigen
BY Whiteley and Caine
ATTORNEYS

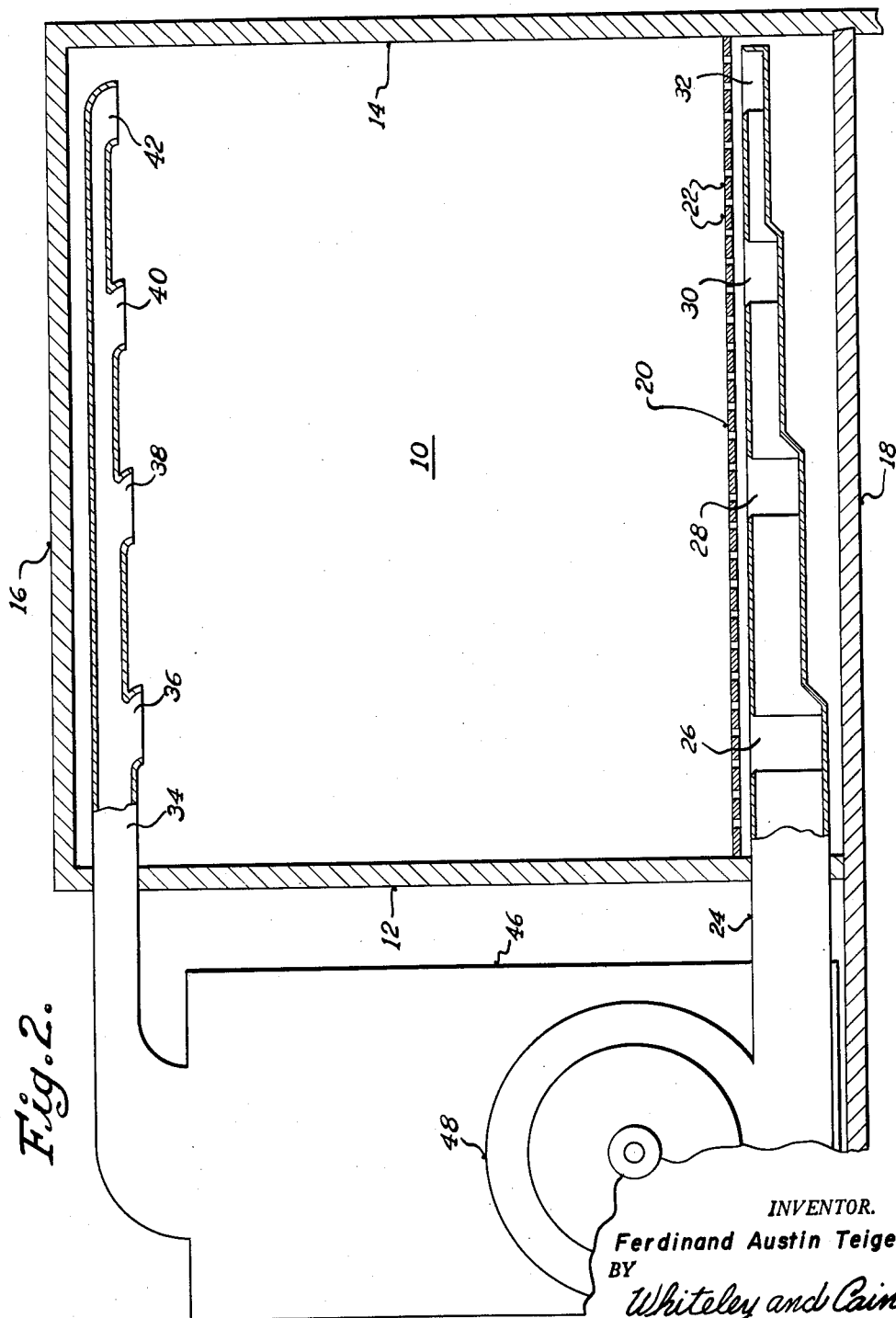

United States Patent Office 3,067,522
Patented Dec. 11, 1962

3,067,522
METHOD OF CURING PERISHABLE BULB ONIONS IN AN ENCLOSURE
Ferdinand Austin Teigen, Minneapolis, Minn., assignor to Allium, Inc., Minneapolis, Minn., a corporation of Minnesota
Filed Oct. 13, 1958, Ser. No. 766,944
10 Claims. (Cl. 34—27)

This invention relates to a method of curing perishable bulb onions in an enclosure. After bulb onions have been grown and harvested, it is essential that they undergo a curing process before they are suitable for disposition on the commercial market.

The curing process is one in which superfluous moisture is removed from the exterior skins, roots and stems, to enhance the appearance and keeping qualities. Bulb onions are living entities and are subject to diverse diseases, many of which are caused by spores and bacteria. If the bulbs are damp on their exterior skins, or contain wounds that are not properly sealed, these areas provide breeding grounds for spores and bacteria, whose growth results in mold formations and disease causing a softening and deterioration of the bulb. The curing process is, therefore, one in which surface moisture is removed and the protoplasmic fluid in any wounds is coagulated, and a general condition is generated, which is inhibitive to the growth and multiplication of spores and bacteria, and the metabolism of the bulbs is stimulated to develop a desired bloom on the outer skins.

The outer skins of onions are hygroscopic and, therefore, absorb and retain moisture and form a condition in which microorganisms will multiply. When the state of hygroscopicity reaches an optimum condition, the outer skins develop a condition whereby when a body of onions are moved a distinct "rattle" is developed. Failure of onions to "rattle" and the tone of the "rattle" are reliable indications of the state of hygroscopicity of the skins of the onions and their physiological condition. If the onions fail to "rattle," the condition indicates that the state of hygroscopicity of the skins of the onions is low, and is a state in which microorganisms can readily develop; whereas, if the tone of the "rattle" is sharp and clear, such is a definite indication of proper curing, and that the state of hygroscopicity of the skins of the onions is comparatively high. Persons skilled in the culture and marketing of onions readily recognize these conditions, and such conditions form a basis of test during the curing of the product.

It is recognized that the succulent tissues of onions contain chemically combined water, and that such moisture must be retained by those tissues to enhance market value. This invention is concerned with the removal of surface moisture on the skins as well as the moisture which is given up by the natural respiratory processes, without extracting or endangering the chemically combined moisture in the cellular structure.

Onions have been cultivated since prior to recorded history in areas surrounding the Mediterranean Sea. Undoubtedly, climatic conditions in that area may have been satisfactory to produce some form of curing by merely exposing the bulbs in some manner to air. As the culture of this vegetable extended to other parts of the world, the primitive curing methods were not substantially improved. In the areas of the United States where onions are grown, curing has largely consisted of exposing the harvested product to the atmosphere in the fields in which they were grown. Field curing is an inefficient process, because of the vagaries of the weather, and results in high losses, as well as substantial deterioration of the product.

Some efforts have been made in the past to cure onions without an enclosure, but prior to the efforts of the applicant herein, none have been successful enough to warrant commercial adoption.

In my co-pending application, Ser. No. 341,038, now Patent 2,855,839, dated October 14, 1958, is disclosed a process of curing and storing onions in an enclosure. The process described in this application constitutes a modification of the prior process.

This application is related to my co-pending applications Ser. Nos. 766,943 and 766,945, filed concurrently herewith.

According to the present process, the onions after matured, are removed from the ground, their tops may be removed, and the product is placed in an enclosure where air, conditioned to be of desirable characteristics, can be properly circulated through the product. The freshly harvested bulbs, when placed in the enclosure, may be of varying temperatures and their skins may be carrying varying amounts of moisture, dependent upon prevailing weather conditions and, therefore, the initial stage of the curing treatment is dependent upon the condition of the bulbs when placed in the enclosure. The product is brought to a proper curing temperature that may require either heating or cooling to a temperature in the range of substantially 50° F.–68° F., by the circulation through the enclosure of air conditioned to have a temperature not excessively different from the temperature of the onions and of a relative humidity within the range of substantially 30%–70%. It should be understood that weather conditions may vary substantially during the harvest season. It is possible that the weather will vary between hot, clear conditions, to rain or even snow, during harvesting and, therefore, the temperature of the onions could vary from a maximum in the vicinity of 90° F. to a minimum of about 32° F. Onions will freeze at a temperature of about 30° F., and in that event they are damaged. Otherwise, insofar as this process is concerned, the bulbs may be either hot or cold, and they may be either relatively dry, or quite damp, or even wet from rain or dew. When the body temperature of the bulbs differ substantially from the curing temperature range, it is advisable to gradually change the bulb temperature, and to limit the capacity of the air to absorb moisture from said bulbs to prevent physiological shock, and to limit the rate and extent of the drying of the skins. Therefore, the temperature of the treating air is preferably limited to be not substantially more than 15° different from the concurrent temperature of the onions. The curing treatment, when started as described, prevails in progressive stages until the body temperature of the onions is within the desired range, and then the condition continues until the tone of the "rattle" is satisfactory. Because the respiratory process in the onions is continuous, moisture is constantly evolved, and unless such moisture is removed, it will tend to lower the state of hygroscopicity of the skins. Therefore, the curing process is a continuing process in the sense of requiring some form of continued attention. It is not necessary that the additional treatment be continuous, and it is sufficient to provide intermittent treatment to maintain the onions within the desired range of temperature and to restore or maintain the desired tone of the rattle. Often it is impracticable to market the product after the initial curing has been completed, and where it is necessary to store the product for prolonged periods in areas where the ambient temperature descends, a secondary process, which in effect amounts to nothing more than maintenance of desired conditions at a lower temperature, prevails until the product is finally shipped.

An object of the invention is the provision of a method of curing onions in an enclosure by the circulation of air through the enclosure and in contact with the onions to establish an optimum curing temperature of the onions, and also progressively establish a state of hygroscopicity in the outer skins thereof, whereby the tone of the rattle of the onions is satisfactory.

Another object is to provide for the curing of onion bulbs by the circulation of conditioned air, whose temperature is not more than substantially 15° F. different from the temperature of the onions until their temperature is established within a range of substantially 50° F.–68° F., and progressively remove free moisture from the skins of the onions until their physiological condition indicates a proper state of cure.

A further object is to regulate the curing of onions with conditioned air that has been compounded and heated to be of a desired temperature and relative humidity, and where the control of the compounding and heating of said air is solely in response to the dry bulb temperature of the air before contact with the onions.

A further object is to provide a method of curing bulb onions with conditioned air which has been composited from two different sources in response to the dry bulb temperature of the composite, and to regulate the heating of said air to reduce the relative humidity thereof in response to the dry bulb temperature of the composited heated air after heating, and to control the curing process in accordance with the physiological conditions of the onions during treatment.

Other and further objects of the invention may be apparent upon a consideration of the following description and claims and in the appended drawing disclosing an exemplary embodiment of a form of apparatus in and by which the process forming the invention may be conducted, wherein:

FIG. 1 discloses a schematic representation of a form of apparatus for treating air which is utilized for the curing of perishable onions and the like, with a portion of the storage space broken away; and, FIG. 2 is a side elevation of a portion of the structure shown in FIG. 1, together with an enclosure in which the onions are stored and treated in accordance with the present invention.

Referring to the appended drawings which are schematic and intended for illustrative purposes only, general reference numeral 10 indicates a substantially airtight enclosure composed of walls 12, 14, 16 and 18 that define a space in which onions may be confined. The enclosure 10 in itself forms no part of the present invention, and would be suitably designed for the curing and/or storage of onions in accordance with climatic conditions in the area wherein located. Within enclosure 10 and extending over the entire lower surface thereof is a false floor 20 composed of a multiplicity of spaced slats which are sufficiently close in their spacing to prevent onion bulbs from penetrating the floor 20, and sufficiently wide in their spacing to permit free circulation of air between slats 22. Between the floors 18 and 20 is a supply air duct 24 that extends through one dimension of enclosure 10 and has a plurality of laterally extending branch ducts 26, 28, 30 and 32. While not shown, each of the branch ducts is provided with a plurality of spaced apertures for discharging and diffusing air under the floor 20, from where said air is forced between the slats 22 into intimate contact with and through a body of onions confined in enclosure 10. The supply air duct 24 penetrates wall 12 and is connected to apparatus situated outside enclosure 10 that will be described hereinafter.

Also within the enclosure 10, beneath the upper wall 16, is situated a return air duct 34 that includes a plurality of perforations 36, 38, 40 and 42 for the entry of air from the space 10 into duct 34. Duct 34 penetrates wall 12 and is also connected to apparatus outside of enclosure 10.

Referring to FIG. 1, general reference numeral 44 indicates apparatus for composing and conditioning air which is used in this invention for curing onions confined in enclosure 10. A mixing chamber or casing 46 is suitably connected to a casing 48 that contains a blower 50 driven by a motor 52 through suitable driving means such as belts 54. The blower 50 is provided to draw air from casing 46 and passages connected thereto, and to discharge said air into the supply duct 24 in sufficient volume to appreciably contact all of the onions confined in enclosure 10. The return air duct 34 is suitably connected to casing 46 at a part thereof spaced substantially from the opening to fan casing 48 and on the suction side of blower 50. Extending from the return air duct 34 is an exhaust air duct 56, and at the junction of these ducts is a pressure actuated damper 58 that permits discharge of air from duct 34 when the pressure of air in duct 34 is in excess of atmospheric pressure. The duct 56 extends to the outside atmosphere, and at least during part of the time serves to relieve superfluous air from the system to the atmosphere.

Also connected to casing 46 is a duct 60 which extends to a source of drier, cooler air, which may be outside fresh air when the dew point and dry bulb temperature of said air is substantially lower than that of the air in enclosure 10.

At the inner terminal ends of ducts 34 and 60 are dampers 62 and 64 that are interconnected by a linkage shown in dotted lines, and indicated at 66. A motor 68, preferably of a modulating type, is connected by a linkage 70 to the linkage 66 for actuating dampers 62 and 64. The dampers 62 and 64 are provided to control the flow of air from ducts 34 and 60 into the mixing chamber 46 within the limits and to the extent that some air is always being admitted from duct 34, when air is being admitted from duct 60 into chamber 46, and which, likewise, always admits some air from duct 60, when air is being admitted from duct 34 into chamber 46, to provide by the resultant mixed air when discharged by blower 50 into the supply duct 24, a mixed air from the two different sources, which is forced through duct 24 into contact with and through the onions confined in enclosure 10.

A source of heat is disclosed in the form of a serpentine coil 72 to impart heat to the mixed air discharged by blower 50 into duct 24. The heater 72 is located preferably as shown at a point in duct 24 substantially remote from the point at which mixed air enters said duct, and also substantially remote from enclosure 10. The location of heater 72 in duct 24 is a mere matter of preference with regard to the location of certain control devices to be discussed hereinafter, and could by suitable adaptation be located ahead of the blower 50 in casing 46. The heater 72 is joined at one end by a supply conduit 74 and contains a suitable flow control device, here shown as a motorized modulating valve 76. An outlet conduit 78 extends from the other end of heater 72. Conduit 74, while not shown, extends from a suitable source of steam or hot water, but if either of those sources of heat are not available, any other suitable source of heat subject to control as by the motorized valve 76, or the like, may be used.

Situated in the supply duct 24 adjacent to the discharge side of the blower 50 is a temperature sensitive bulb 80 of a thermostatic control device 82. Said devices 80 and 82 are responsive to the temperature of the mixed air discharged by blower 50 into duct 24 before said air has passed into heat exchange relationship with heater 72. The control 82 is connected by a suitable cable 84 to motor 68, in a manner capable of effecting modulating movement of motor 68 in either direction to open and substantially close dampers 62 and 64 within fixed limitations in response to changes in the temperature of the mixed air after being discharged by blower 50 into the supply duct 24 and before passing in heat exchange relationship with heater 72, to apportion the proportions of air simultaneously admitted into the chamber 46 from the ducts 34 and 60.

Also situated in the supply duct 24 at a point beyond the location of the heater 72, and in the direction of air flow, and adjacent to the point at which the air is discharged into enclosure 10 after passing in heat exchange relationship with heater 72 is a temperature sensitive bulb 86 of a thermostatic control device 88. The controls 86, 88, are responsive to the dry bulb temperature of the mixed air passing through duct 24 after passage in heat exchange relationship with the heater 72 and before contacting the onions confined in enclosure 10. The control device 88 is connected by a cable 90 to the motorized valve 76 in a manner capable of effecting modulating movement of the operative portion of motorized valve 76 in either direction to open and close said valve in response to changes in the dry bulb temperature of the mixed air passing through duct 24 after said air has been passed in heat exchange relationship with heater 72, and before contacting the onions confined in enclosure 10, to thereby apportion the impartation of heat to said air in accordance with the temperature setting of the thermostatic control device 88.

It has been stated heretofore that it is essential that the supply of air passing through duct 60 into chamber 46 must have a dew point and dry bulb temperature which is lower than the concurrent temperature of air in enclosure 10. Ordinarily, in the areas of the northern part of the United States and lower Canada, which constitute the areas where a substantial portion of onions are grown, following the harvest period, the ambient conditions would ordinarily be satisfactory to provide air of the desired characteristics. However, this condition is not always true, and furthermore, substantial quantities of onions are grown in warmer domestic regions that include Texas and California, where ambient conditions would not be suitable for this process. To always assure a source of drier, cooler air, or where the process is practiced in warmer climates, a duct 92 extends between duct 56 and duct 60, and contains a suitable form of air conditioning mechanism 94, whose capacity is sufficient to be able to reduce the condition of air within duct 56 to the desired dry bulb and dew point temperature. A control damper 96 is disposed between the discharge side of duct 92, and duct 60 for controlling the source of air entering duct 60. It should be understood that when the mechanism 94 is operative and damper 96 is rotated to the dotted line position, the air entering duct 92 will be either fresh outside air or air discharged from duct 34 through damper 58, or a mixture of air from both of said sources.

From the foregoing, it will be clear that with the apparatus disclosed, having suitable capacity, the onions confined in enclosure 10 can be cured regardless of weather conditions, and regardless of the condition of the onions when confined in enclosure 10.

The process will now be explained. As a first condition, assume that freshly harvested onions have been disposed in the storage space 10 for curing, and the onions are damp as a result of rain, snow, or dew, and have a temperature of substantially 32° F. It is also assumed that outside fresh air has a dew point and dry bulb temperature of substantially 32° F. To effect a proper curing of the onions, their temperature should be gradually raised to attain a final temperature in the range of substantially 50° F.–68° F., in which range the onions are maintained during the primary stage of the curing process, whereafter their temperature is gradually reduced to substantially 32° F. for terminal cure; however, the following description relates to the primary curing step. Under the assumption stated, thermostat 88 is adjusted to respond to changes in the temperature of mixed air in duct 24 above and below a degree of temperature which is not excessively different from the temperature of the onions, when the onion temperature is substantially different from the desired curing range temperature, and under the conditions stated, thermostat 88 would have a setting of substantially 47° F. The thermostat 82 is always set at a lower degree of temperature than thermostat 88, and will always be set at a temperature at least 10° F. and preferably not more than 20° F. lower than the setting of thermostat 88.

When the refrigeration apparatus 94 is operated, thermostat 82 would be set at a temperature of as much as 20° F. lower than the setting of thermostat 88. On the other hand, when the refrigeration apparatus is not in use, and ambient fresh air is used as the principal component of the mixed air, the setting of thermostat 82 is preferably about 12° F. lower than the setting of thermostat 88. When the fresh air has a dry bulb temperature equal to the setting of thermostat 82, which in this example is substantially 35° F., said fresh air may have a relative humidity ranging from 50% to 100%. Therefore, upon being heated 12° F., or to the specified temperature of 47° F., such air may have a relative humidity ranging from substantially 30% to 70%. It is true that when the ambient temperature is 35° F., the air may have a relative humidity which is less than 50%, but this condition would only occur rarely. Therefore, the 12° F. differential is preferred even though the minimum differential is specified as being 10° F. Thus, the minimum differential of 10° F. is applicable only when fresh ambient air is used as the principal component of the mixed air.

When air is conditioned by apparatus 94, its dew point temperature will approximate its dry bulb temperature, and therefore, its relative humidity after being heated will not vary substantially, as might be the case with fresh ambient air. Consequently, to reduce the relative humidity of the conditioned air by heating the same to have a relative humidity of substantially 40%–50% requires that it be heated about 20° F. Therefore, when the air is conditioned by apparatus 94, the thermostat 82 is generally adjusted to a setting of about 20° F. lower than the setting of thermostat 88. Consequently, it should be understood that the minimum differential of 10° F. between the setting of thermostats 82 and 88 applies only when fresh ambient air is the principal component of the mixed airs, and a differential of 20° F. applies when the apparatus 94 is operated to provide conditioned cooler, drier air.

When the onions are both cool and wet, the differential in setting between thermostats 82 and 88 is in excess of the minimum setting, and under the present conditions, the thermostat 82 would be adjusted to a setting of substantially 27° F.

With the parts disposed as shown in FIG. 1, and fan 50 in operation, air would be drawn from the return duct 34 through damper 62 into chamber 46, and thence driven by the fan 50 into the supply duct 24 and in contact with the bulb of thermostat 82. The temperature of the air in enclosure 10 is also substantially 32° F., and therefore, as this relatively warm air is circulated over thermostat 82, the damper motor 68 is energized to move damper 62 towards a closed position and to move damper 64 towards an open position, thereby admitting fresh outside air into chamber 46, which is passed through the fan 50 into the supply duct 24. Since the setting of thermostat 88 is above the 32° F. temperature of the air passing into enclosure 10, the motorized valve 76 is energized to admit heating medium to the coil 72, whence the temperature of the air in duct 24 is increased to 47° F., and as a result thereof, the temperature of the onions is gradually raised. After passing through the onions, the air is forced into the return duct 34, and as the setting of damper 62 greatly reduces re-use of the return air, the major portion of the return used air is discharged through the gravity operated damper 58 and duct 56 to outside atmosphere. As the body temperature of the onions gradually increases, as a result of the operation just described, the setting of thermostat 88 is also increased, but still within the preferred 15° F. limitation, as it is desirable to progressively heat the onions until their temperature reaches the desired curing range temperature. As the setting of thermostat 88 is increased, the setting of thermostat 82 is also increased, and the same differential in temperatures is preferably maintained until the onions start to dry, after which it is reduced to a differential of 12° F. As the temperature of the supply air after heating is increased, its relative humidity is correspondingly reduced, and at 47° F. temperature would be less than substantially 70% and more than substantially 30%. This action liberates free vaporizable water carried by the skins, roots, and stems of the onions, and therefore, reduces the hygroscopicity of the skins of the onions to a state to be inhibitive to the incidence and progress of disease, and when progressively conducted, forms and increases the tone of the "rattle" of the onions when they are moved relative to one another. The operation as thus described continues until the temperature of the onions in the enclosure 10 has been raised to the desired curing temperature, and the tone or "rattle" of the onions is satisfactory.

Under any conditions, with respect to "rattle," the onions are progressively heated until their temperature reaches 50° F., and thereafter, the process continues until the "rattle" of the onions reaches the desired tone, but at a different setting of the controls than previously existed. As the temperature of the onions increases above the temperature of 50° F., the differential between the setting of thermostat 88 with respect to the temperature of the onions is reduced from a preferred 15° F. differential to not less than a 10° F. differential to thereby reduce the rate of heating of the onions while still supplying an adequate amount of air whose relative humidity is less than 70%, but more than 30%, until the desired tone of the rattle is attained, which is ordinarily attained before the onions reach a temperature of substantially 68° F.

Assuming another condition, where the freshly harvested onions are placed in the enclosure at a temperature of substantially 80° F., as a result of the sun's temperature, and the temperature of the outside air is also substantially 80° F. Under these conditions, it is desirable to cool the onions, bringing their temperature downwardly into the curing range. In this example, thermostat 88 is set at a temperature of 65° F., and thermostat 82 is set at the preferred differential of 20° F. below the setting of thermostat 88, or at a temperature of 45° F. When the outside temperature is higher than the setting of thermostat 82, it is necessary to cool and dehumidify air through the refrigeration apparatus 94, and said apparatus is placed in operation with damper 96 rotated to the dotted line position so that return air is drawn from duct 34 and a certain amount of fresh air may also be drawn in through the outer end of duct 56, the composite of which forms the mixed air entered through duct 60. Return air may also be drawn from duct 34 through damper 62 into chamber 46. Assuming, therefore, that such mixed air has a dew point and dry bulb temperature of substantially 45° F., it is passed from fan 50 into heat exchange relationship with heater 72 and in contact with the temperature sensing portion 86 of thermostat 88, which energizes the motorized valve 76 to supply heating medium to the heater 72 to heat such air to a temperature of substantially 65° F., whence such air is forced into contact with the onions in enclosure 10, and gradually reduces the temperature of said onions, in addition to removing the free moisture from the skins thereof as previously described. Again, as the temperature of the onions is gradually reduced to the desired curing range, the setting of thermostats 88, 82, is adjusted to a correspondingly lower temperature, and the operation continues until the temperature of the onions is reduced to at least 68° F. When the onions have reached a temperature of substantially 68° F., the controls are reset by adjusting thermostat 88 to a temperature of substantially 60° F., and the differential setting of thermostat 82 continues to be 20° F. lower than the setting of thermosat 88, dependent upon the physiological condition of the onions, whence the operation is continued until the desired tone of the rattle is attained.

Assuming a third condition where the temperature of the freshly harvested onions placed in enclosure 10 is substantially 60° F., and the temperature of the outside air is also 60° F. Under such circumstances, thermos at 88 is preset to a temperature of 62° F., and thermostat 82 is set at a temperature of substantially 42° F. Again, under such circumstances, the refrigeration unit 94 is utilized, because the outside air temperature is higher than the setting of thermostat 82, and the refrigeration unit 94 is utilized to provide air having a temperature as low or lower than the setting of thermostat 82. As before, the mixture of air delivered by fan 50 into the supply duct 24 will have a temperature less than the setting of thermostat 88, and the valve 76 is energized to supply heating medium so as to heat such air to 62° F., which when it is passed over the onions in enclosure 10 loses temperature and picks up moisture that is conducted out of duct 34. Since the onions are being neither heated nor cooled to any substantial extent, the operation continues until a suitable tone of "rattle" is attained.

Assuming a fourth condition, where the temperature of the onions in enclosure 10 is substantially 60° F., and the temperature of the outside fresh air is 48° F. Under such circumstances, thermostat 88 is preset to a temperature of 62° F., and thermostat 82 is preset to a temperature preferably 12° F. lower, or at 50° F. Under these conditions, fresh ambient air is used as the cooler, drier air. The mixture of return air and fresh ambient air delivered by fan 50 into the supply duct 24 will have a temperature lower than the setting of thermostat 88 and the valve 76 will be actuated by thermostat 88 to supply heating medium to the heater 72 to heat said mixed air from 50° F. to 62° F. When said heated air contacts the onions initially, it will have a relative humidity in the range of 30%–70%, unless the relative humidity of the fresh ambient air is less than 50%, which would be a rarity.

In each of the foregoing examples, it has been assumed that the dry bulb and dew point temperatures of the outside air has been substantially constant, and it is recognized that in practice, this condition will not prevail, particularly during the season of the year when onions are harvested, for at such times, both the dry bulb and dew point temperatures of outside air change substantially during each day, and particularly during the night. If the refrigeration unit has been used in order to reduce the dry bulb and dew point temperature of the return air, and the temperature of the fresh air drops down to or below the setting of thermostat 82, then the function of unit 94 is no longer needed, and the differential between thermostats 82 and 88 is reduced to a preferable differential of 12° F., and damper 96 is rotated to its full line position whence outside fresh air is used regardless of how low its temperature may descend, since the mechanisms actuated by thermostats 82, 88, are able to compensate for such variations. Thus, as the dry bulb temperature of the fresh ambient air descends, such as during the night, below its former dew point and setting of thermostat 82, its capacity to absorb moisture as it is heated to the setting of thermostat 88 increases. To offset this effect, thermostat 82 actuates the damper motor 68 to reduce the proportion of fresh ambient air which is brought into the mixing chamber 46, and proportionately increases the amount of return air from duct 34, so that the proportions of fresh and return air in the mixture is changed to the extent that when heated, the relative humidity of the mixture of heated air remains within the desired range of 30%–70%.

Considering next the condition of the onions after they have been brought into the desired curing temperature range, and the tone of rattle is initially satisfactory, the mechanism including fan 54 is shut down. However, the natural biological action of the onions continues, and in due time, the tone of the rattle will change as a result of the evolution and surrender of moisture by the onions and the hygroscopic action of the outer skins, and the operation of the mechanism must be intermittently initiated to restore the desired tone of the rattle. Assuming that there has been no substantial change in the temperature of the onions, the setting of thermostat 83 remains substantially the same, and the preferred 12° F.–20° F. differential setting of thermostat 82, relative to thermostat 88, is maintained, and the system is operated until the desired tone of the rattle is restored. This action is intermittently conducted until the end of the primary stage of curing, whence the temperature of the onions is reduced to substantially 32° F., and the terminal stage of the curing is continued until the onions are shipped. In the principal areas where commercial onions are grown, the outside temperature during terminal cure is relatively low, and often substantially below 20° F. Under these conditions, the thermostat 88 is set at a temperature of approximately 34° F., and thermostat 82 is set at 24° F., and the operation continued as described heretofore. During the terminal stage of curing, it is only necessary to remove superfluous moisture in the measure necessary to retain the proper tone of rattle as no refrigerating effect is normally required.

The principal advantage of the present invention is the provision of a method of curing onions in an enclosure by controlling the dryness and temperature of the onions so as to attain and maintain the highest possible market value thereof.

Another advantage is the provision of a method of curing onions in an enclosure which eliminates the need to use humidity conditions in air as a source or means of regulating the condition of air forced into contact with the onions.

A further advantage is the provision of a method of curing onions confined in an an enclosure, which method comprises control and regulation by the use of dry bulb temperature measurements and the tone of the "rattle" of the onions.

I claim:

1. A method of curing fresh perishable onions including the steps of: confining said onions in a substantially air tight insulated enclosure; providing a specific for the treatment of said onions during confinement in said enclosure to enhance curing by withdrawing and mixing air from said enclosure, which air by specific reference is designated and hereinafter known and referred to as said warmer air, with at least a sufficient volume of colder fresh air from outside having a dew point substantially lower than that of said warmer air, which air by specific reference is designated and hereinafter known and referred to as said colder air, to cause the resultant mixed air, which air by specific reference is designated and hereinafter known and referred to as said mixed air, to have a dew point lower than that of said warmer air; adjusting and regulating the temperature of said mixed air to be of a degree at least sufficiently low to cause said mixed air to have a dew point lower than that of said warmer air by varying the volume of said colder air mixed with said warmer air in composing said mixed air in accordance with changes in the temperature of said mixed air after composition and before heating; forming said mixed air into an entitative stream flowing through said onions; heating said mixed air to have a temperature of a concurrently desired degree within a range of 31° F.–78° F.; adjusting and regulating the temperature of the resultant heated mixed air, which air by specific reference is designated and hereinafter known and referred to as said heated air, to be of a degree at least sufficiently high to cause said heated air when forced into initial contact with said onions to have a vapor pressure lower than that of said warmer air and to be of a degree at least sufficiently different from the concurrent temperature of said onions to cause said heated air to have the capacity to affect the concurrent temperature of said onions when outside of 50° F.–68° F. during early and substantially 32° F. during later stages of curing in a concurrently desired manner and measure by varying the heating of said mixed air in accordance with changes in the temperature of said heated air after composition and before contacting said onions; forcing said heated air into contact with and through said onions during confinement in said enclosure except when said onions have neither superfluous moisture nor a temperature outside of 50° F.–68° F. during early and substantially 32° F. during later stages of curing, and discharging superfluous air from said enclosure.

2. A method of curing fresh perishable onions including the steps of: confining said onions in a substantially air tight insulated enclosure; providing a specific for the treatment of said onions during confinement in said enclosure to enhance curing by withdrawing and mixing air from said enclosure, which air by specific reference is designated and hereinafter known and referred to as said warmer air, with at least a sufficient volume of colder fresh air from outside having a dew point substantially lower than that of said warmer air, which air by specific reference is designated and hereinafter known and referred to as said colder air, to cause the resultant mixed air, which air by specific reference is designated and hereinafter known and referred to as said mixed air, to have a dew point lower than that of said warmer air; adjusting and regulating the temperature of said mixed air to be of a degree at least sufficiently low to cause said mixed air to have a dew point lower than that of said warmer air by varying the volume of said colder air mixed with said warmer air in composing said mixed air in accordance with changes in the temperature of said mixed air after composition and before heating; forming said mixed air into an entitative stream flowing through said onions; heating said mixed air to have a temperature of a concurrently desired degree within a range of 31° F.–78° F.; adjusting and regulating the temperature of the resultant heated mixed air to be of a degree at least sufficiently high to cause said heated air when forced into initial contact with said onions to have the capacity to dissipate superfluous moisture carried by said onions and to be of a degree at least sufficiently different from the concurrent temperature of said onions when outside of 50° F.–68° F. during early and substantially 32° F. during later stages of curing to have the capacity to adjust the temperature of said onions toward a concurrently desired degree by varying the heating of said mixed air in accordance with changes in the temperature of said heated air after composition and before contacting said onions; forcing said heated air into contact with and through said onions during confinement in said enclosure except when said onions have neither superfluous moisture nor a temperature outside of 50° F.–68° F. during early and substantially 32° F. during later stages of curing, and discharging superfluous air from said enclosure.

3. A method of curing fresh perishable onions including the steps of: confining said onions in a substantially air tight insulated enclosure; providing a specific for the treatment of said onions during confinement in said enclosure to enhance curing by withdrawing and mixing air from said enclosure, which air by specific reference is designated and hereinafter known and referred to as said warmer air, with at least a sufficient volume of colder fresh air from outside having a dew point substantially lower than that of said warmer air, which air by specific reference is designated and hereinafter known and referred to as said colder air, to cause the resultant mixed air, which air by specific reference is designated and hereinafter known and referred to as said mixed air, to have a dew point lower than that of said warmer air; adjusting and regulating the temperature of said mixed air to be of a degree at least sufficiently low to cause said mixed air to have a dew point lower than that of said warmer air by varying the volume of said colder air mixed with said warmer air in composing said mixed air in accordance with changes in the temperature of said mixed air after composition and before heating; forming said mixed air into an entitative stream flowing through said onions; heating said mixed air to have a temperature of a concurrently desired degree within a range of 31° F.–78° F.; adjusting and regulating the temperature of the resultant heated mixed air, which air by specific reference is designated and hereinafter known and referred to as said heated air, to be of a degree at least sufficiently high to cause said heated air when forced through said onions to absorb superfluous moisture when carried by said onions and to be of a degree at least sufficiently different from the concurrent temperature of said onions to cause said heated air when forced through said onions to adjust the temperature of said onions when outside 50° F.–68° F. during early and substantially 32° F. during later stages of curing toward concurrently desired degree by varying the heating of said mixed air in accordance with changes in the temperature of said heated air after composition and before contacting said onions; forcing said heated air into contact with and through said onions during confinement in said enclosure except when said onions have neither superfluous moisture nor a temperature outside of 50° F.–68° F. during early and substantially 32° F. during later stages of curing, and discharging superfluous air from said enclosure.

4. A method of curing fresh perishable onions including the steps of: confining said onions in a substantially air tight insulated enclosure; providing a specific for the treatment of said onions during confinement in said enclosure to enhance curing by withdrawing and mixing air from said enclosure, which air by specific reference is designated and hereinafter known and referred to as said warmer air, with at least a sufficient volume of colder air processed and conditioned to have and having a dew point substantially lower than that of said warmer air, which air by specific reference is designated and hereinafter known and referred to as said colder air, to cause the resultant mixed air, which air by specific reference is designated and hereinafter known and referred to as said mixed air, to have a dew point lower than that of said warmer air; adjusting and regulating the temperature of said mixed air to be of a degree at least sufficiently low to cause said mixed air to have a dew point lower than that of said warmer air by varying the volume of said colder air mixed with said warmer air in composing said mixed air in accordance with changes in the temperature of said mixed air after composition and before heating; forming said mixed air into an entitative stream flowing through said onions; heating said mixed air to have a temperature of a concurrently desired degree within a range of 31° F.–78° F.; adjusting and regulting the temperature of the resultant heated mixed air, which air by specific reference is designated and hereinafter known and referred to as said heated air, to be of a degree at least sufficiently high to cause said heated air when forced into initial contact with said onions to have a vapor pressure lower than that of said warmer air and to be of a degree at least sufficiently different from the concurrent temperature of said onions to cause said heated air to have the capacity to affect the concurrent temperature of said onions when outside of 50° F.–68° F. during early and substantially 32° F. during later stages of curing in a concurrently desired manner and measure by varying the heating of said mixed air in accordance with changes in the temperature of said heated air after composition and before contacting said onions; forcing said heated air into contact with and through said onions during confinement in said enclosure except when said onions have neither superfluous moisture nor a temperature outside of 50° F.–68° F. during early and substantially 32° F. during later stages of curing, and discharging superfluous air from said enclosure.

5. A method of curing fresh perishable onions including the steps of: confining said onions in a substantially air tight insulated enclosure; providing a specific for the treatment of said onions during confinement in said enclosure to enhance curing by withdrawing and mixing air from said enclosure, which air by specific reference is designated and hereinafter known and referred to as said warmer air, with at least a sufficient volume of colder air processed and conditioned to have and having a dew point substantially lower than that of said warmer air, which air by specific reference is designated and hereinafter known and referred to as said colder air, to cause the resultant mixed air, which air by specific reference is designated and hereinafter known and referred to as said mixed air, to have a dew point lower than that of said warmer air; adjusting and regulating the temperature of said mixed air to be of a degree at least sufficiently low to cause said mixed air to have a dew point lower than that of said warmer air by varying the volume of said colder air mixed with said warmer air in composing said mixed air in accordance with changes in the temperature of said mixed air after composition and before heating; forming said mixed air into an entitative stream flowing through said onions; heating said mixed air to have a temperature of a concurrently desired degree within a range of 31° F.–78° F.; adjusting and regulating the temperature of the resultant heated mixed air, which air by specific reference is designated and hereinafter known and referred to as said heated air, to be of a degree at least sufficiently high to cause said heated air to have the capacity when forced into initial contact with said onions to dissipate superfluous moisture carried by said onions and to be of a degree at least sufficiently different from the concurrent temperature of said onions when outside of 50° F.–68° F. during early and substantially 32° F. during later stages of curing to have the capacity to adjust the temperature of said onions toward a concurrently desired degree by varying the heating of said mixed air in accordance with changes in the temperature of said heated air after composition and before contacting said onions; forcing said heated air into contact with and through said onions during confinement in said enclosure except when said onions have neither superfluous moisture nor a temperature outside of 50° F.–68° F. during early and substantially 32° F. during later stages of curing, and discharging superfluous air from said enclosure.

6. A method of curing fresh perishable onions including the steps of: confining said onions in a substantially air tight insulated enclosure; providing a specific for the treatment of said onions during confinement in said enclosure to enhance curing by withdrawing and mixing air from said enclosure, which air by specific reference is designated and hereinafter known and referred to as said warmer air, with at least a sufficient volume of colder air processed and conditioned to have and having a dew point substantially lower than that of said warmer air, which air by specific reference is designated and hereinafter known and referred to as said colder air, to cause the resultant mixed air, which air by specific reference is designated and hereinafter known and referred to as said mixed air, to have a dew point lower than that of said warmer air; adjusting and regulating the temperature of said mixed air to be of a degree at least sufficiently low to cause said mixed air to have a dew point lower than that of said warmer air by varying the volume of said colder air mixed with said warmer air in composing said mixed air in accordance with changes in the temperature of said mixed air after composition and before heating; forming said mixed air into an entitative stream flowing through said onions; heating said mixed air to have a temperature of a concurrently desired degree within a range of 31° F.–78° F.; adjusting and regulating the temperature of the resultant heated mixed air, which air by specific reference is designated and hereinafter known and referred to as said heated air, to be of a degree at least sufficiently high to cause said heated air when forced through said onions to absorb superfluous moisture carried by said onions and to be of a degree at least sufficiently different from the concurrent temperature of said onions to cause said heated air when forced through said onions to adjust the temperature of said onions when outside 50° F.–68° F. during early and substantially 32° F. during later stages of curing toward degree concurrently desired by varying the heating of said mixed air in accordance with changes in the temperature of said heated air after composition and before contacting said onions; forcing said heated air into contact with and through said onions during confinement in said enclosure except when said onions have neither superfluous moisture nor a temperature outside of 50° F.–68° F. during early and substantially 32° F. during later stages of curing, and discharging superfluous air from said enclosure.

7. A method of curing fresh perishable onions including the steps of: confining said onions in a substantially air tight insulated enclosure; providing a specific for the treatment of said onions during confinement in said enclosure to enhance curing by withdrawing and mixing air from said enclosure, which air by specific reference is designated and hereinafter known and referred to as said warmer air, with at least a sufficient volume of colder air having a dew point substantially lower than that of said warmer air, which air by specific reference is designated and hereinafter known and referred to as said colder air, to cause the resultant mixed air, which air by specific reference is designated and hereinafter known and referred to as said mixed air, to have a dew point lower than that of said warmer air; adjusting and regulating the temperature of said mixed air to be of a degree causing said mixed air to have a dew point lower than that of said warmer air by varying the volume of said colder air mixed with said warmer air in composing said mixed air in accordance with changes in the temperature of said mixed air after composition and before heating; forming said mixed air into an entitative stream flowing through said onions; heating said mixed air to have a temperature of a concurrently desired degree within a range of 31° F.–78° F.; adjusting and regulating the temperature of the resultant heated mixed air, which air by specific reference is designated and hereinafter known and referred to as said heated air, to be of a degree causing said heated air to have the capacity when forced through said onions to remove superfluous moisture from and adjust the temperature of said onions by varying the heating of said mixed air in accordance with changes in the temperature of said heated air after composition and before contacting said onions; forcing said heated air into contact with and through said onions during confinement in said enclosure except when said onions have neither superfluous moisture nor a temperature outside of 50° F.–68° F. during early and substantially 32° F. during later stages of curing, and discharging superfluous air from said enclosure.

8. A method of curing fresh perishable onions including the steps of: confining said onions in a substantially air tight insulated enclosure; providing a specific for the treatment of said onions during confinement in said enclosure to enhance curing by withdrawing and mixing air from said enclosure, which air by specific reference is designated and hereinafter known and referred to as said warmer air, with at least a sufficient volume of colder air having a dew point substantially lower than that of said warmer air, which air by specific reference is designated and hereinafter known and referred to as said colder air, to cause the resultant mixed air to have a dew point lower than that of said warmer air; adjusting and regulating the temperature of said mixed air to be of a degree at least sufficiently low to cause said mixed air to have a dew point lower than that of said warmer air by varying the volume of said colder air mixed with said warmer air in composing said mixed air in accordance with changes in the temperature of said mixed air after composition and before heating; forming said mixed air into an entitative stream flowing thru said onions; heating said mixed air to have a temperature of a concurrently desired degree within a range of 31° F.–78° F.; adjusting and regulating the temperature of the resultant heated mixed air, which air by specific reference is designated and hereinafter known and referred to as said heated air, to be of a degree at least sufficiently high to cause said heated air to have the capacity when forced into initial contact with said onions to dissipate superfluous moisture carried by said onions and to be of a degree of least sufficiently different from the concurrent temperature of said onions when outside of 50° F.–68° F. during early and substantially 32° F. during later stages of curing to have the capacity to adjust the temperature of said onions toward a concurrently desired degree by varying the heating of said mixed air in accordance with changes in the temperature of said heated air after composition and before contacting said onions; forcing said heated air into contact with and thru said onions during confinement in said enclosure except when said onions have neither superfluous moisture nor a temperature outside of 50° F.–68° F. during early and substantially 32° F. during later stages of curing, and discharging superfluous air from said enclosure.

9. A method of curing fresh perishable onions including the steps of: confining said onions in a substantially air tight insulated enclosure; providing a specific for the treatment of said onions during confinement in said enclosure to enhance curing by withdrawing and mixing air from said enclosure, which air by specific reference is designated and hereinafter known and referred to as said warmer air, with at least a sufficient volume of colder air having a dew point substantially lower than that of said warmer air, which air by specific reference is designated and hereinafter known and referred to as said colder air, to cause the resultant mixed air to have a dew point lower than that of said warmer air; adjusting and regulating the temperature of said mixed air, which air by specific reference is designated said mixed air, to be of a degree at least sufficiently low to cause said mixed air to have a dew point lower than that of said warmer air by varying the volume of said colder air mixed with said warmer air in composing said mixed air in accordance with changes in the temperature of said mixed air after composition and before being heated; forming said mixed air into an entitative stream flowing thru said onions; heating said mixed air to have a temperature of a concurrently desired degree within a range of 31° F.–78° F.; adjusting and regulating the temperature of the resultant heated mixed air, which air by specific reference is designated and hereinafter known and referred to as said heated air, to be of a degree at least sufficiently high to cause said heated air when forced thru said onions to absorb superfluous moisture from when carried by said onions and to be of a degree at least sufficiently different from the concurrent temperature of said onions to cause said heated air when forced thru said onions to adjust the temperature of said onions when outside 50° F.–68° F. during early and substantially 32° F. during later stages of curing toward degree concurrently desired by varying the heating of said mixed air in accordance with changes in the temperature of said heated air after composition and before contacting said onions; forcing said heated air into contact with and thru said onions during confinement in said enclosure except when said onions have neither superfluous moisture nor a temperature outside of 50° F.–68° F. during early and substantially 32° F. during later stages of curing, and discharging superfluous air from said enclosure.

10. A method of curing fresh perishable onions including the steps of: confining said onions in a substantially air tight insulated enclosure; providing a specific for the treatment of said onions during confinement in said enclosure to enhance curing by withdrawing and mixing air from said enclosure, which air by specific reference is designated and hereinafter known and referred to as said warmer air, with at least a sufficient volume of colder air having a dew point substantially lower than that of said warmer air, which air by specific reference is designated and hereinafter known and referred to as said colder air, to cause the resultant mixed air, which air by specific reference is designated and hereinafter known and referred to as said mixed air, to have a dew point lower than that of said warmer air; adjusting and regulating the temperature of said mixed air to be of a degree at least sufficiently low to cause said mixed air to have a dew point lower than that of said warmer air by varying the volume of said colder air mixed with said warmer air in composing said mixed air in accordance with changes in the temperature of said mixed air after composition and before heating; forming said mixed air into an entitative stream flowing thru said onions; heating said mixed air to have a temperature of a concurrently desired degree within a range of 31° F.–68° F.; adjusting and regulating the temperature of the resultant heated mixed air, which air by specific reference is designated and hereinafter known and referred to as said heated air, to be of a degree at least sufficiently high to cause said heated air when forced into initial contact with said onions to have a relative humidity substantially lower than that of said warmer air and to be of a degree different from the temperature of said onions in the direction and the measure concurrently desired by varying the heating of said mixed air in accordance with changes in the temperature of said heated air after composition and before contacting said onions; forcing said heated air into contact with and thru said onions during confinement in said enclosure except when said onions have neither superfluous moisture nor a temperature outside of 50° F.–68° F. during early and substantially 32° F. during later stages of curing, and discharging superfluous air from said enclosure.

References Cited in the file of this patent

UNITED STATES PATENTS

| | | |
|---|---|---|
| 2,048,137 | Palmer | July 21, 1936 |
| 2,274,153 | Miller | Feb. 24, 1942 |
| 2,286,316 | Snook | June 16, 1942 |
| 2,855,839 | Teigen | Oct. 14, 1958 |